United States Patent
Matsuhama

[19]

[11] Patent Number: 5,865,030
[45] Date of Patent: Feb. 2, 1999

[54] GAS TURBINE COMBUSTOR WITH LIQUID FUEL WALL COOLING

[75] Inventor: Masaaki Matsuhama, Komaki, Japan

[73] Assignee: Mitsubishi Jukogyo Kabushiki Kaisha, Tokyo, Japan

[21] Appl. No.: 595,249

[22] Filed: Feb. 1, 1996

[30] Foreign Application Priority Data

Feb. 1, 1995  [JP]  Japan .................................. 7-015131
Feb. 1, 1995  [JP]  Japan .................................. 7-015132
Dec. 21, 1995 [JP]  Japan .................................. 7-333253

[51] Int. Cl.⁶ .................................................. F02C 7/08
[52] U.S. Cl. .................. 60/736; 60/267; 60/737; 60/39.281; 60/39.29
[58] Field of Search ................... 60/266, 267, 730, 60/736, 737, 39.281, 39.29

[56] References Cited

U.S. PATENT DOCUMENTS

| | | | |
|---|---|---|---|
| 1,828,784 | 10/1931 | Perrin | 60/730 |
| 2,575,070 | 11/1951 | Reed et al. | 60/267 |
| 2,589,215 | 3/1952 | Atwood | 60/267 |
| 2,975,592 | 3/1961 | Fox | 60/266 |
| 2,999,359 | 9/1961 | Murray | 60/737 |
| 3,377,803 | 4/1968 | Prachar | 60/736 |
| 3,379,009 | 4/1968 | Sharp et al. | 60/736 |
| 3,788,065 | 1/1974 | Markowski | 60/737 |
| 3,977,182 | 8/1976 | Schroff | 60/281 |
| 4,052,144 | 10/1977 | Marek | 60/39.511 |
| 4,078,604 | 3/1978 | Christl et al. | 60/267 |
| 4,429,537 | 2/1984 | Schultz | 60/736 |
| 4,781,019 | 11/1988 | Wagner | 60/267 |
| 5,319,936 | 6/1994 | Ikeda et al. | 60/737 |

*Primary Examiner*—Timothy Thorpe
*Assistant Examiner*—Ted Kim
*Attorney, Agent, or Firm*—Wenderoth, Lind & Ponack

[57] ABSTRACT

A gas turbine combustor 1 prevents an inequality of distribution of temperatures at the outlet of the combustor which might otherwise be caused by cooling air introduced into the combustor. A liner 2 having an outer liner 2' and an inner liner 2", is disposed within a casing 3 of the gas turbine combustor 1. The liner 2 is composed of a liner inner cylinder 15, having liner cooling paths 16, and a liner outer cylinder 14. Fuel supplied via upstream side manifolds 9 and 10 flows through the liner cooling paths 16 and is discharged from a downstream side manifold 11 after cooling the liner 2. The fuel is boosted by a pump and is supplied to a fuel-air pre-mixer 13 from a fuel supply port 12 so as to be burned in the combustion chamber.

6 Claims, 9 Drawing Sheets

FACE EXPOSED TO COMBUSTION GAS

FACE EXPOSED TO
COMBUSTION GAS

GAS TURBINE COMBUSTOR WITH LIQUID FUEL WALL COOLING

BACKGROUND OF THE INVENTION

1. Field of the Invention

The present invention relates to a gas turbine combustor using liquid fuel as its fuel and more particularly to a gas turbine combustor for an aircraft engine.

2. Description of the Related Art

FIG. 11 shows a prior art gas turbine combustor. In the figure, the gas turbine combustor 1 comprises a cylindrical casing 3 composed of an outer casing 3' and an inner casing 3" centered on a center line of rotation 50 of a turbine rotor blade 6. A cylindrical liner 2 is composed of an outer liner 2' and an inner liner 2" and is disposed within the casing 3 concentrically therewith.

Formed through the outer liner 2' and the inner liner 2" are an air hole 40 for supplying combustion air to a combustion chamber to form a flame holding area and a slot 41 for supplying dilution air to the combustion chamber to lower the temperature of combustion gas to a predetermined turbine inlet temperature and to reduce NOx.

Air supplied from a compressor to a space between the casing 3 and the liner 2 flows toward the turbine along the liner 2 and cools the outer surface of the liner 2. During the flow of air, a part of the air flows into the combustion chamber from the air hole 40 described above and the other part thereof flows into the combustion chamber from the slot 41 and cools the inner surface of the liner 2.

It is noted that a guide vane 20 at an outlet of the compressor is provided at the upstream side of the casing 3. A turbine nozzle 30 is provided at the downstream end of the casing 3. A fuel supply inlet 12, a fuel-air pre-mixer 13 and an igniter 71 are provided as shown in the figure.

Because the air cooling the liner 2 flows into the combustion chamber partially from the air hole 40 and the slot 41 as described above, there have been problems in that the liner 2 is not cooled equally, and a hot spot is apt to be created at an area downstream of the air hole 40. This causes a melt-down in which a part of the liner is melted and lost.

The hot spot is caused, partially, because the balanced temperature of the liner 2 can only becomes high, because the liner 2 is cooled by air having poor heat transfer characteristics, and because, due to the poor heat transfer characteristics, it can only use a liner material such as hastelloy X whose thermal conductivity is poor, though its high temperature strength is good.

Accordingly, it is a primary object of the present invention to provide a gas turbine combustor which prevents such a hot spot, which leads to a melt-down, from being produced, by use of a material having good thermal conductivity, though the high temperature strength thereof is small, as a liner material by cooling the liner 2 equally with liquid fuel having a heat transfer characteristic higher than that of air.

SUMMARY OF THE INVENTION

In order to solve the aforementioned problems of the gas turbine combustor having the liner forming the combustion chamber and the fuel-air pre-mixer, provided within and at the upstream side of the liner, for mixing liquid fuel with air supplied from the compressor and supplying it to the combustion chamber, according to the present invention, a gas turbine combustor constructed as follows is provided.

A first gas turbine combustor of the present invention comprises a casing whose upstream side is connected with an outlet side of a compressor and whose downstream side is connected with a downstream side of a liner and which forms a space between the casing and the liner. A plurality of flow paths are provided within the liner for flowing liquid fuel in the longitudinal direction of the liner. Means are provided at one end of the liner for supplying liquid fuel to the fuel paths. Means are provided at the other end of the liner for discharging the liquid fuel from the fuel paths. An air hole is created through the liner for supplying air supplied from the compressor to the space between the casing and the liner to the combustion chamber as combustion air to produce a flame holding area.

According to the gas turbine combustor constructed as described above, the liquid fuel flows to the flow paths provided within the liner and cools the liner equally, so that no hot spot which might otherwise be produced at the downstream portion of the air hole is produced. Thus a material having a good heat transfer characteristic, though its high temperature strength is small, may be used as a material of the liner.

Next, a second gas turbine combustor of the present invention provided to solve the aforementioned problems has a structure in which the air hole which has been provided through the liner in the first gas turbine combustor of the present invention is eliminated, and a flame holding area producing means is provided downstream of the fuel-air pre-mixer.

Because no air hole is provided through the liner, the gas turbine combustor constructed as described above, the fuel flow paths within the liner may be readily formed. An inequality of distribution of combustion gas temperature at the outlet of the combustor, which would otherwise be caused by the air hole, may be prevented. These effects are in addition to the effects of the first gas turbine combustor described above.

Further, a third gas turbine combustor of the present invention provided to solve the aforementioned problems has a structure in which the downstream side of the casing whose upstream side is connected with the outlet side of the compressor is connected with the upstream side of the liner in the second gas turbine combustor described above.

The above construction, a casing function is given to the liner, so that the size of the combustor may be reduced by eliminating the space between the liner and the casing. Thereby the length of the shaft connecting the compressor with the turbine may be shortened and the size and weight of the combustor and the whole system may be reduced, in addition to the effects obtained in the gas turbine combustor of the second invention described above.

It is preferable to construct the third gas turbine combustor of the present invention so that the liner has a double-layer structure with an outer cylinder and an inner cylinder in which the fuel flow paths are created. The inner cylinder is made of a material having a high heat transfer characteristic, and the outer cylinder is made of a material having high strength, to be able to improve the liner cooling effect and to enhance the strength of the combustor itself, in addition to the aforementioned effects.

It is also preferable to construct the first through third gas turbine combustors of the present invention so that the sectional shape of the fuel path within the liner perpendicular to the direction of the flow is approximately square. The section face of the combustion chamber side preferably projects in the direction opposite from the combustion chamber in order to equalize the temperature distribution in the liner face in the fuel paths. Calking of fuel, which might otherwise be caused by a partially increased temperature of the fuel flowing through the flow path on the side of the combustion chamber, is thus prevented.

Further, in the first through third gas turbine combustors of the present invention, it is preferable to provide a means for detecting the temperature of fuel flowing through each of the fuel paths created within the liner at the fuel discharge side. It is also preferable to provide a means for controlling the amount of fuel supplied to each fuel path in accordance with the detected fuel temperature at the fuel supply side in order to equalize the liner temperature and to prevent a local melt-down of the liner and the calking of fuel.

In the first through third gas turbine combustors of the present invention, it is further preferable to provide a means for detecting a temperature of combustion gas discharged from the liner in the direction of the center line of the axis of rotation of the fuel-air pre-mixer. It is also preferable to provide a means for controlling the amount of air supplied to the combustion chamber in accordance with the detected combustion gas temperature at the upstream side of the fuel-air pre-mixer within the liner in order to equalize the distribution of temperature of the combustion gas at the outlet of the combustor, which might otherwise vary due to the circumferential distribution of air supplied from the compressor and to obtain a high efficient turbine output.

The above and other related objects and features of the present invention will be apparent from a reading of the following description of the invention illustrated in the accompanying drawings.

DETAILED DESCRIPTION OF PREFERRED EMBODIMENTS

Figure 1:
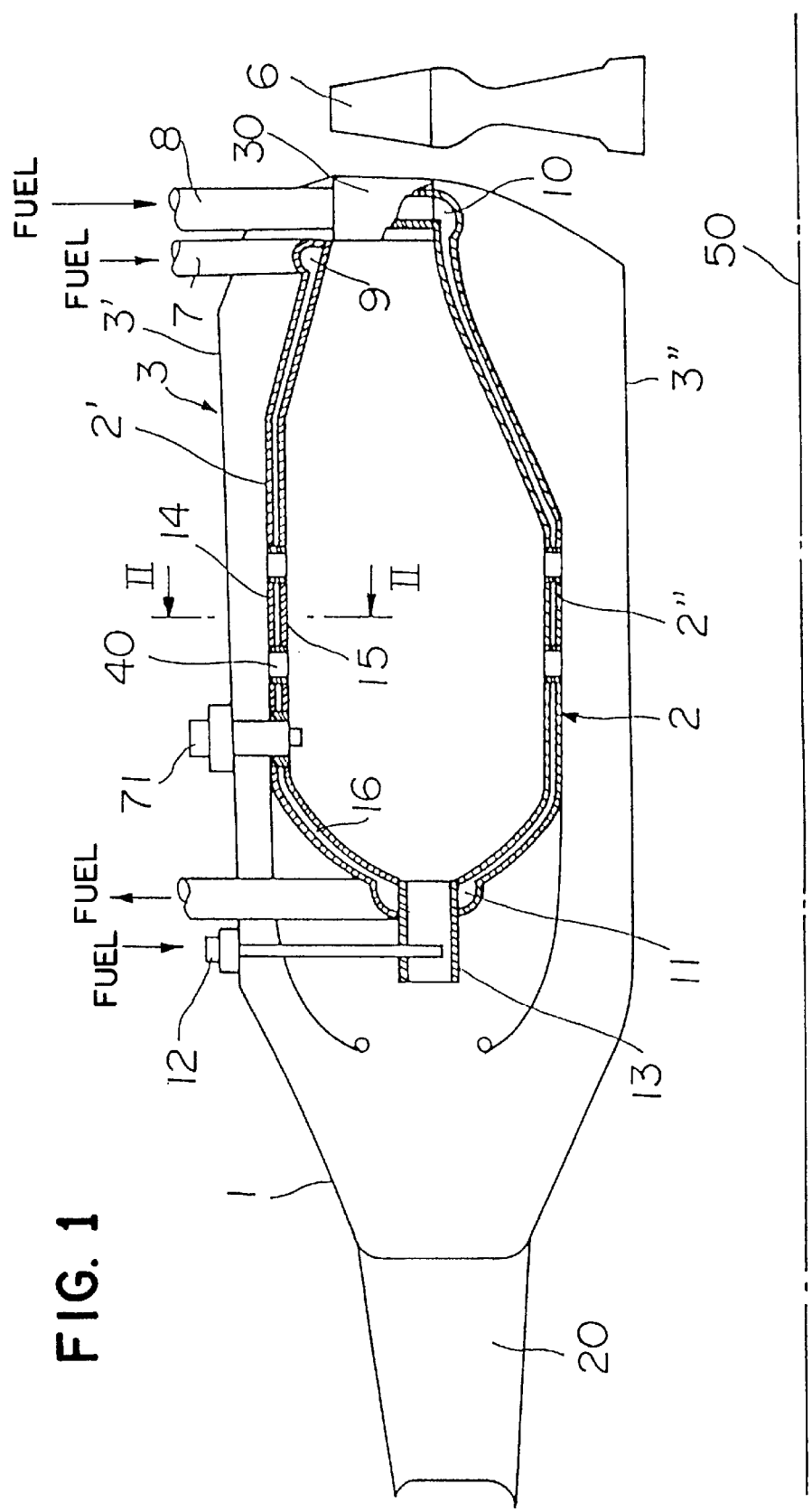
FIG. 1 is a structural drawing of a gas turbine combustor according to a first embodiment of the present invention.

A gas turbine combustor of the present invention will be explained below concretely based on preferred embodiments thereof shown in FIGS. 1 through 10. It is noted that in order to simplify the explanation, the same reference numerals refer to corresponding parts of the prior art unit shown in FIG. 11 throughout several views.

First Embodiment

The first embodiment of the present invention will be explained below with reference to FIGS. 1 through 3. A liner 2 has a double-layer structure composed of a liner outer cylinder 14 and a liner inner cylinder 15 as shown in a section view thereof in FIG. 2. A plurality of fuel paths 16, each having a square section and formed in the longitudinal direction of the liner 2, are provided in the circumferential direction of the liner 2.

Figure 3:
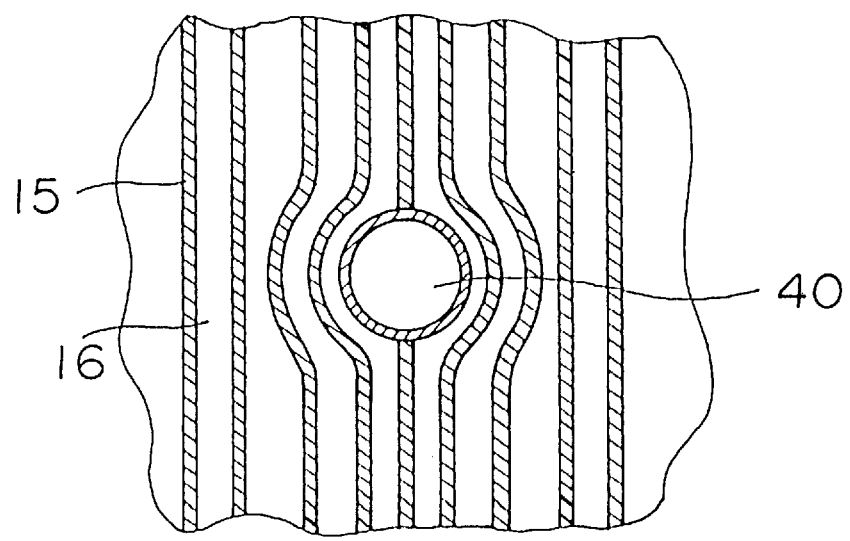
FIG. 3 is a section view along a line III—III in FIG. 2.

Further, as shown in FIG. 3, an air hole 40 is created through the liner inner cylinder 15 and the liner outer cylinder 14 and the fuel paths 16 detour around the air hole 40.

Fuel (jet-A, liquid hydrogen, liquid methane, etc.) introduced from the outside via fuel supply pipes 7 and 8 and downstream manifolds 9 and 10 is supplied to the fuel paths 16 and flows toward the upstream side, thereby absorbing the heat of the liner 2 and cooling the liner 2 equally.

As a result, no hot spot is created at the downstream part of the air hole 40, because the fuel paths 16 are also formed around the air hole 40, as described above. Further, because the liner 2 is cooled by the liquid fuel having a high heat transfer characteristic, a material (e.g. copper) having good thermal conductivity, even if its high temperature strength is small, may be used as a material of the liner.

The high temperate fuel arriving at the upstream side of the liner is discharged outside of the combustor 1 via an upstream side manifold 11, boosted to a predetermined pressure by a fuel pump (not shown), and then supplied to a fuel-air pre-mixer 13 via a fuel supply port 12.

Meanwhile, part of the air supplied from the compressor to the space between the casing 3 and the liner 2 flows into the combustion chamber from the air hole 40 as combustion air and produces a flame holding area within the combustion chamber, thus maintaining a continuous and stable combustion. Dilution air is supplied to the combustion chamber via the fuel-air pre-mixer 13.

It is noted that when the fuel pressure at the upstream side manifold 11 is sufficiently high, the fuel may be supplied directly to the fuel supply port 12 without sending it to a fuel pump. Further, it is not necessary to supply all of the fuel supplied from the outside to the fuel paths 16, and only a part thereof may suffice.

Figure 2:
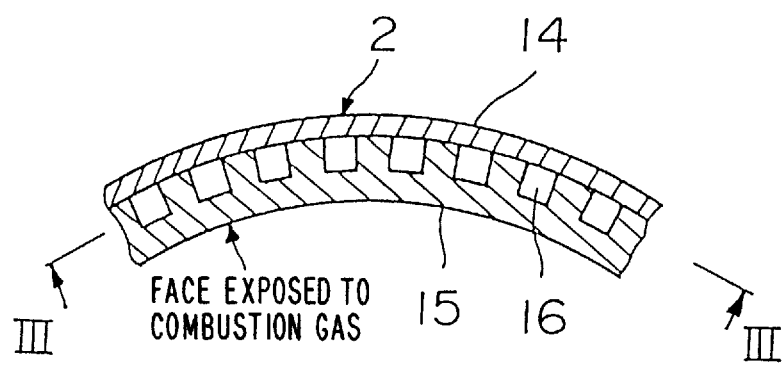
FIG. 2 is a section view along a line II—II in FIG. 1.

It is also noted that a heat resistant coating may be applied to the face in FIG. 2 which is exposed to the combustion gas.

Second Embodiment

Figure 4:
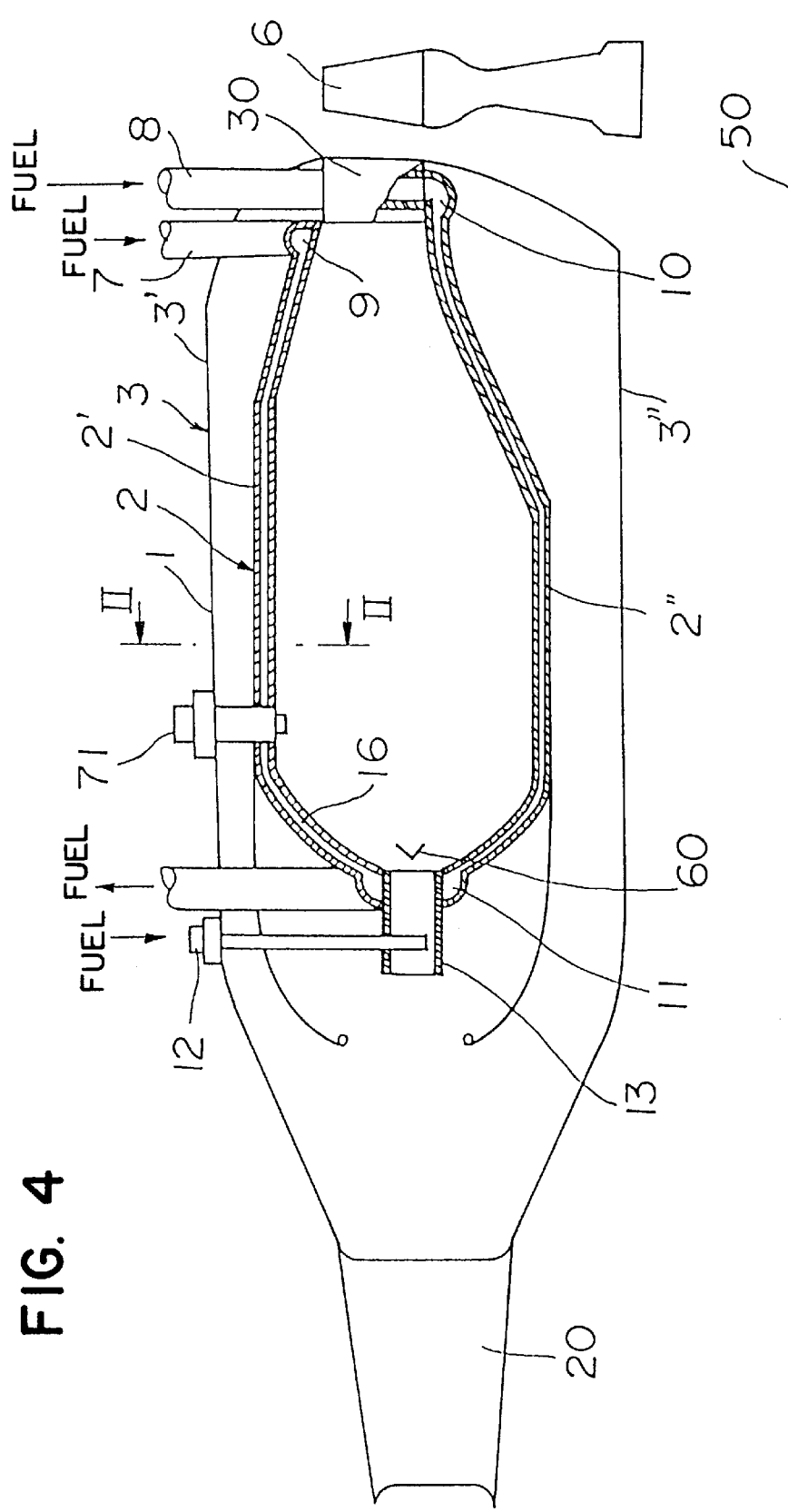
FIG. 4 is a structural drawing of a gas turbine combustor according to a second embodiment of the present invention.

The second embodiment of the present invention will be explained below based on FIG. 4, concentrating on the differences from the first embodiment. The structure of the liner 2 of the second embodiment is the same as with the first embodiment in that the plurality of fuel paths formed in the longitudinal direction are provided within the liner 2 in the circumferential direction thereof as shown in FIG. 2. It is different from the first embodiment in that the liner 2 is completely closed, except for a fuel-air mixed gas introducing section and a combustion gas discharging section of the liner 2, and that the air hole 40 is eliminated.

Further, because the flame holding area for holding combustion continuously and stably cannot be created, as the air hole 40 of the first embodiment is eliminated, a flame holding area is created by providing a bluff-body type flame holder 60 at the downstream side of the fuel-air pre-mixer 13, instead of the air hole 40.

Fuel is supplied to and discharged from the fuel paths 16 in the same manner as the first embodiment. Further, all the combustion and dilution air is supplied to the combustion chamber via the fuel-air pre-mixer 13.

The present embodiment has the advantage that the fuel paths 16 may be readily formed because they don't need to be formed by detouring the air hole, in addition to the advantages obtained by the first embodiment.

Further, it becomes possible to equalize the distribution of combustion gas temperature at the outlet of the combustion chamber even more by eliminating the air hole and the air flow entering to the combustion chamber from the outer periphery of the liner 2.

It is noted that although the bluff-body type flame holder has been used as a flame holding means in the present embodiment, it is possible to use a Vgutter, round-nose Vgutter or jet-curtain type flame holder. However, the flame holding means is not confined to using the above-described flame holders.

Third Embodiment

Figure 5:
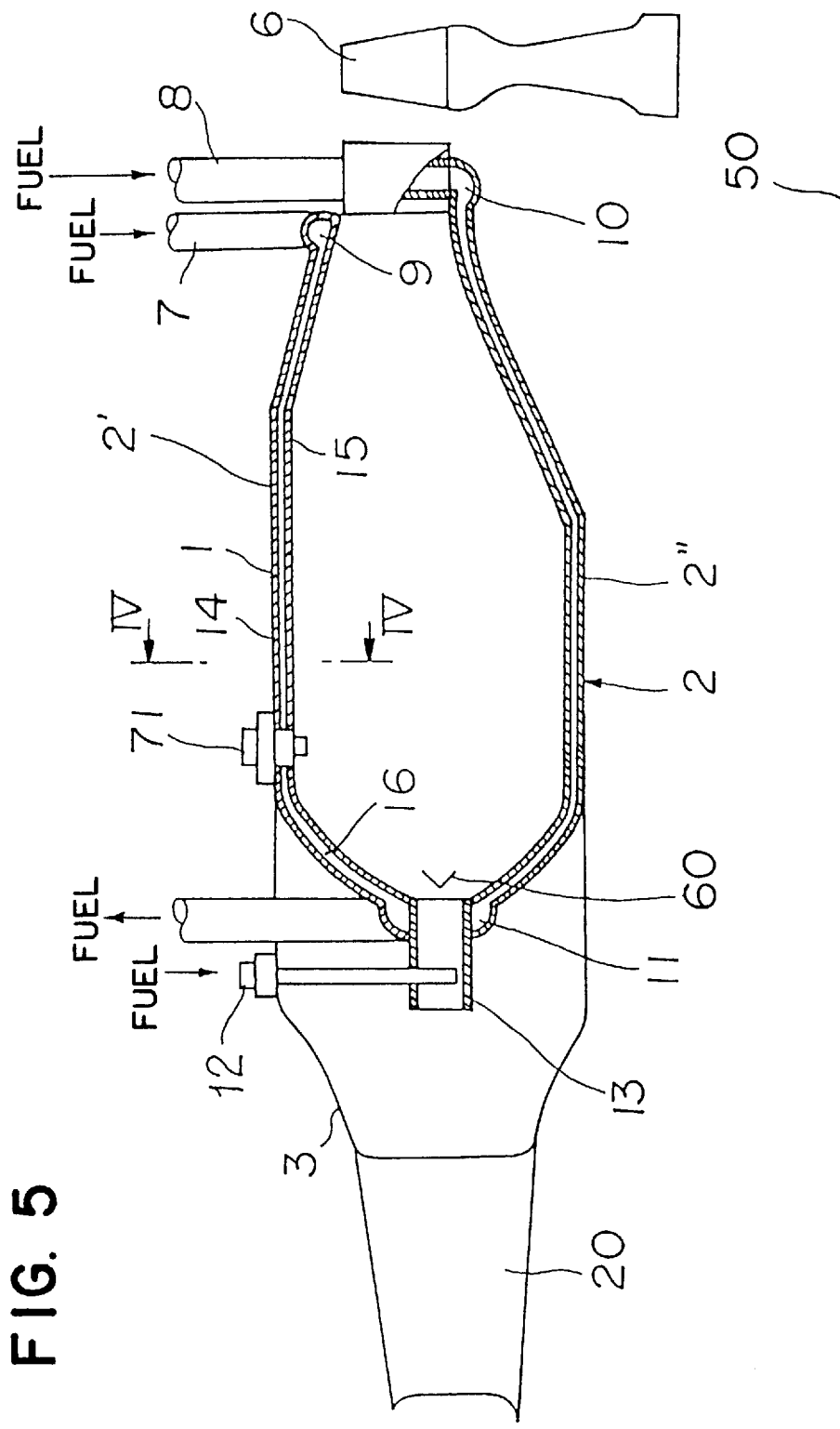
FIG. 5 is a structural drawing of a gas turbine combustor according to a third embodiment of the present invention.
Figure 6:
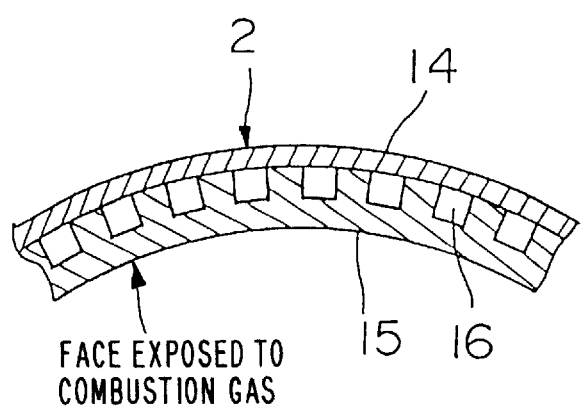
FIG. 6 is a section view along a line IV—IV in FIG. 5.

The third embodiment of the present invention will be explained below based on FIG. 5, concentrating on the differences from the second embodiment. The third embodiment is characterized in that the downstream side of the casing 3, whose upstream side is connected with the outlet of the compressor, has the same diameter as the liner 2. It is connected with the upstream side of the liner 2 to provide the function of the casing 3 to the liner 2.

The third embodiment is also the same as the second embodiment in that the fuel paths 16 are provided within the liner 2. The fuel is supplied to and discharged from the fuel paths 16, and the dilution air is supplied to the combustion chamber via the fuel-air pre-mixer 13.

The present embodiment has the advantage that the size of the combustion chamber may be reduced by eliminating the space between the liner 2 and the casing 3. Thereby the length of a shaft connecting the compressor with the turbine may be shortened, thus allowing a reduction in the size and weight of the whole system, in addition to the advantages achieved by the second embodiment.

Further, the cooling effect of the liner 2 may be increased. The liner 2, which has the additional function of the casing and has the double-layer structure of the liner outer cylinder 14 and the liner inner cylinder 15, has the fuel paths 16 provided in the liner inner cylinder 15 and is formed with a material having a high thermal conductivity. Moreover, the strength of the overall combustor 1 can be enhanced and the liner 2 can form the casing fully by using a material having a high strength for the liner outer cylinder 14.

Fourth Embodiment

The fourth embodiment of the present invention will be explained below based on FIGS. 7 and 8. The present embodiment is characterized in that the sectional shape of the fuel path is changed. They can be applied to the fuel paths in the first through third embodiments.

Figure 7:
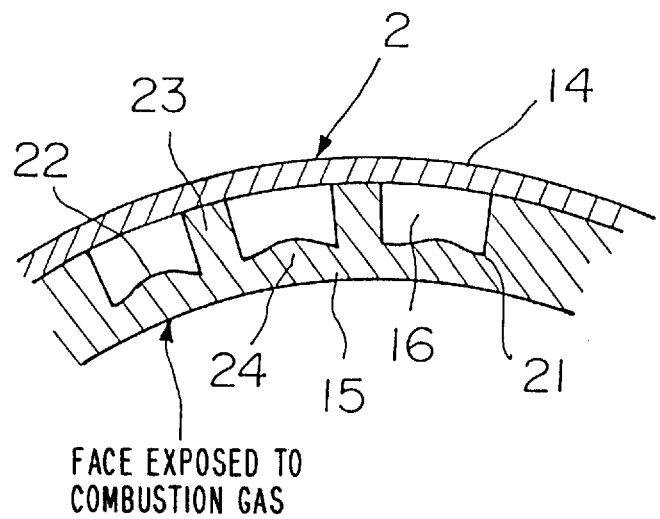
FIG. 7 is a section view showing a structure of a liner in a gas turbine combustor according to a fourth embodiment of the present invention.

As shown in FIG. 7, the fuel path 16 of the present embodiment provided in the liner inner cylinder 15 has an approximately square section looking in the longitudinal direction of the liner 2. That is, a face 22 of the fuel path 16 projects in the direction away from the combustion chamber. The liner outer cylinder 14 and fin sections 23 are provided as shown in the figure.

Figure 8:
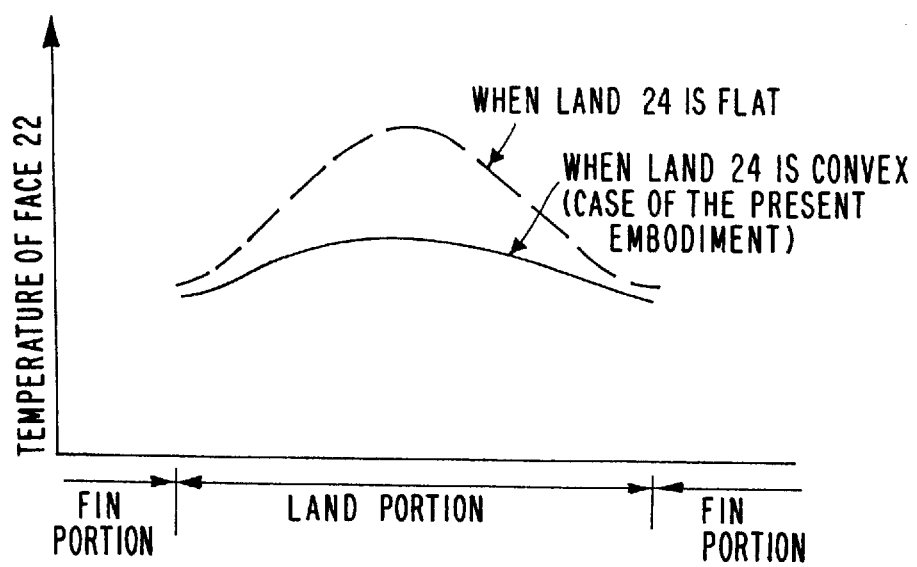
FIG. 8 is a graph explaining an operation of the liner in the gas turbine combustor according to the fourth embodiment of the present invention.

Since the heat penetrating to an angled portion 21 has a greater degree of freedom in relief, the temperature distribution of the face 22 would become as indicated by a broken line in FIG. 8, in which the middle portion is high when a land 24 (a thickness between the face exposed to the combustion gas and the fuel path 16) is flat, i.e. the fuel path 16 has a square section. That is, because the face 22 is exposed to the highest temperature among the portions of the fuel path 16, the temperature of the middle portion of the face 22 becomes the highest.

In general, hydrocarbon fuel such as Jet-A causes thermal decomposition, and carbon is deposited (a process referred to as calking) under a certain high temperature. Accordingly, it becomes necessary to prevent calking from occurring due to the partial high temperature portion described above when the hydrocarbon fuel flows to the fuel paths 16.

Calking is prevented by equalizing the temperature distribution of the face 22 as indicated by a solid line in FIG. 8, and by suppressing the partial high temperature portion by projecting the face 22 toward the fuel path 16 as a whole. A peak is at the middle portion thereof to increase the area of the face 22 and to increase the thickness of the land 24, as described above.

Fifth Embodiment

The fifth embodiment of the present invention will be explained below with reference to FIG. 9. A combustor 1 shown in FIG. 9, in addition to the structure of the first embodiment shown in FIG. 1, has a fuel temperature detecting sensor 62 provided at the downstream side of each fuel path 16. A fuel flow amount control valve 61 is provided at the upstream side of each fuel path 16, and a fuel supply amount controller 80 controls a valve opening angle of the control valve 61 based on a detected value of the sensor 62. The remaining structure is the same as the embodiment shown in FIG. 1, and the explanation thereof is omitted here.

Figure 9:
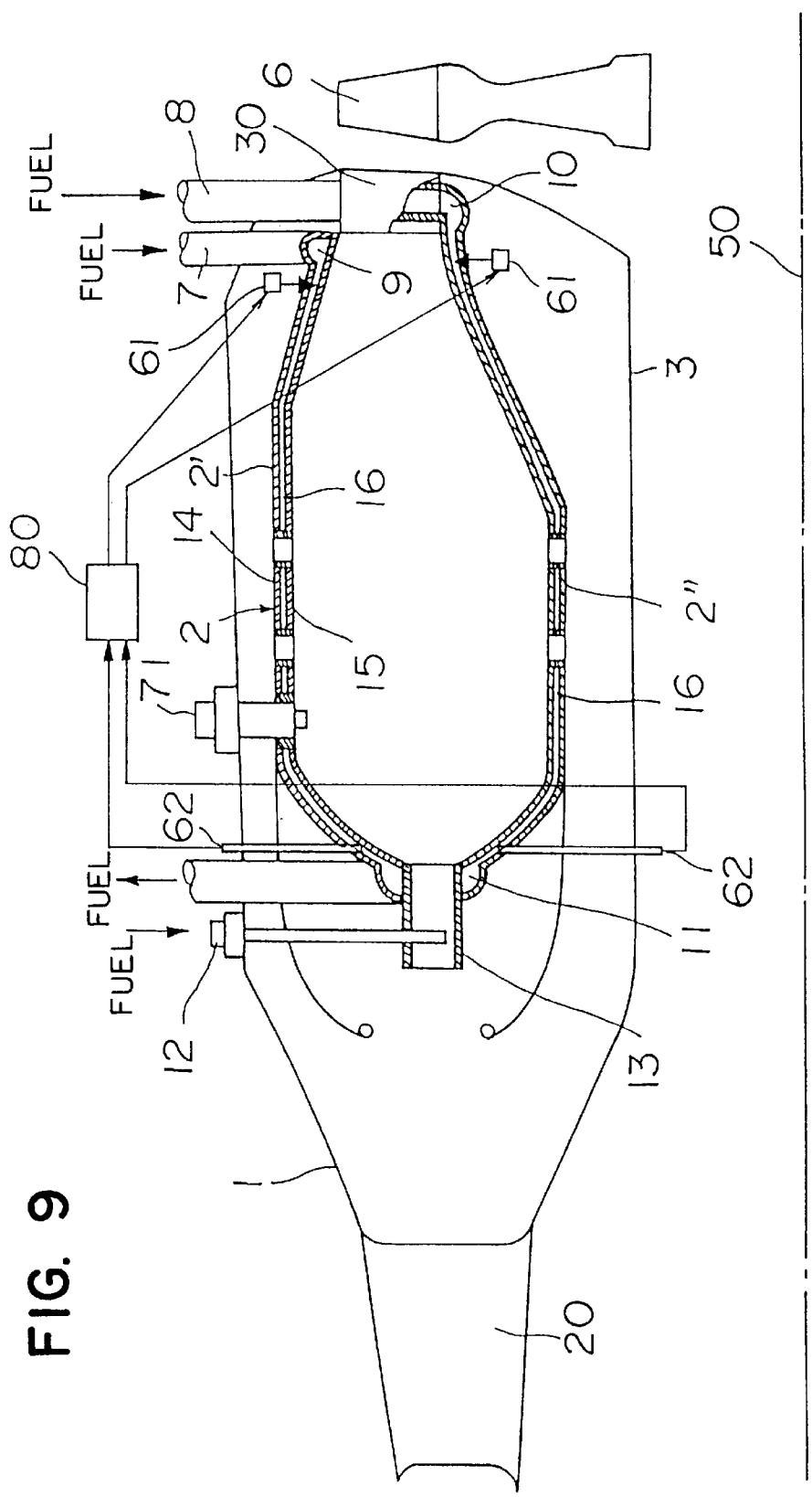
FIG. 9 is a structural drawing of a gas turbine combustor according to a fifth embodiment of the present invention.

As shown in FIG. 9, a fuel temperature detected by each fuel temperature detecting sensor 62 is input to the fuel supply amount controller 80. The fuel supply amount controller 80 calculates an average value of each inputted detected value, finds a +/- difference between the average value and each detected value and outputs a valve opening angle signal corresponding to the +/- difference to each corresponding fuel flow amount control valve 61.

The valve opening angle of the fuel amount control valve 61 is controlled in correspondence with the signal, and the amount of fuel supplied to each fuel path 16 is increased or decreased accordingly.

It is noted that the relationship between the +/- difference between the average value and the detected value an the valve opening angle signal is found and stored in the fuel supply amount controller 80 in advance.

With the construction as described above, the liner 2 may be cooled equally and a partial melt-down of the liner 2 may be prevented, even if the temperature of part of the liner 2 rises due to a partial change in combustion within the combustion chamber, by suppressing any local high temperature portion from occurring by increasing the amount of fuel flowing through the appropriate portion.

It is noted that although the valve opening angle of the fuel flow amount control valve 61 has been controlled based on the difference between the average value and each detected value of the fuel temperature in the present embodiment, the present invention is not confined to this relationship. That is, it is also possible to set an adequate value of fuel temperature at the downstream side of the fuel path 16 in advance and to control the valve opening angle of the fuel flow amount control valve 61 so that the fuel holds at that temperature.

The present embodiment has the advantage of it becoming possible to prevent the liner 2 from overheating as a whole, and to prevent calking from occurring when the hydrocarbon fuel is used. Needless to say, the present embodiment may be applied to the second and third embodiments.

Sixth Embodiment

Figure 10:
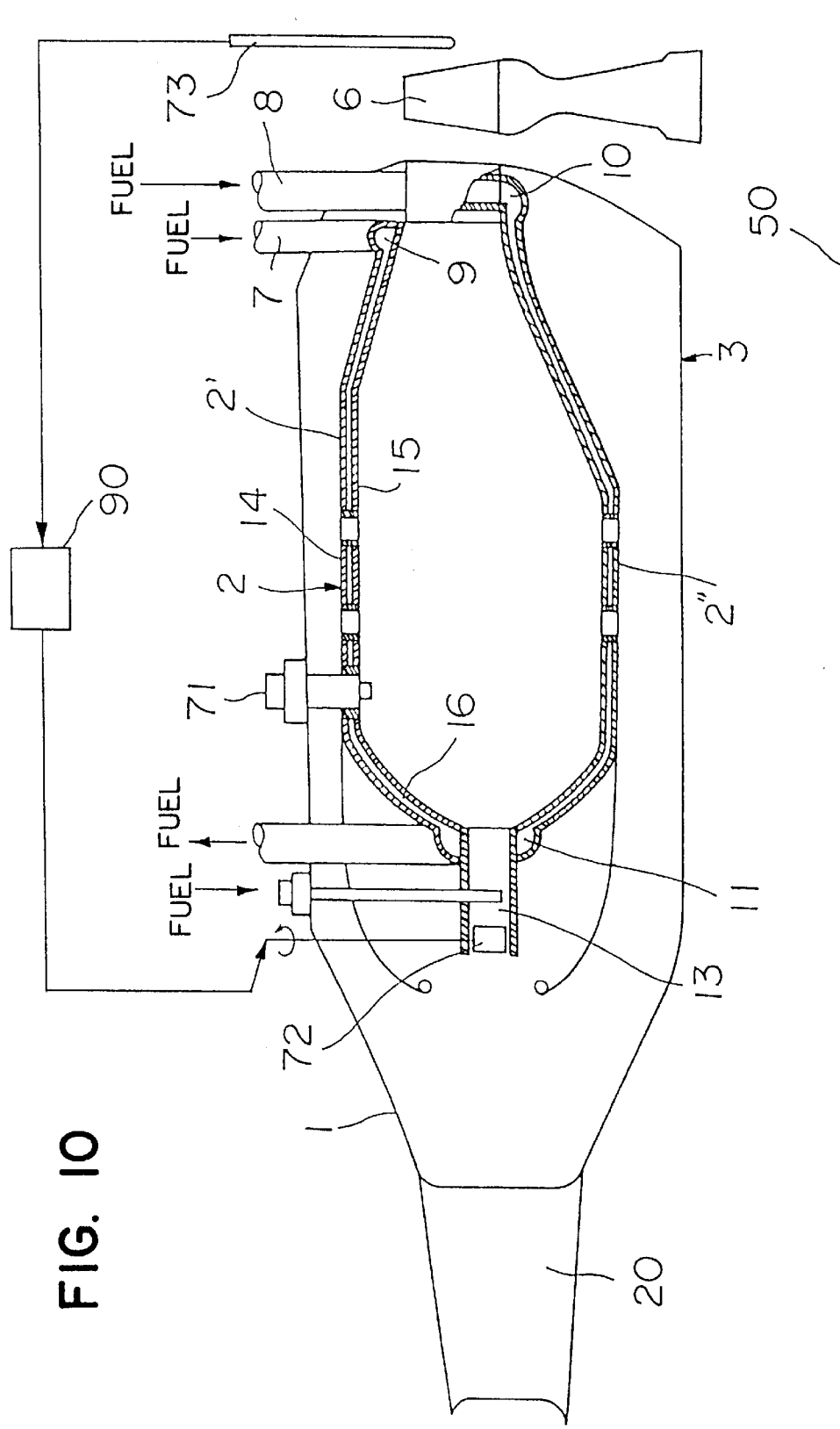
FIG. 10 is a structural drawing of a gas turbine combustor according to a sixth embodiment of the present invention.
Figure 11:
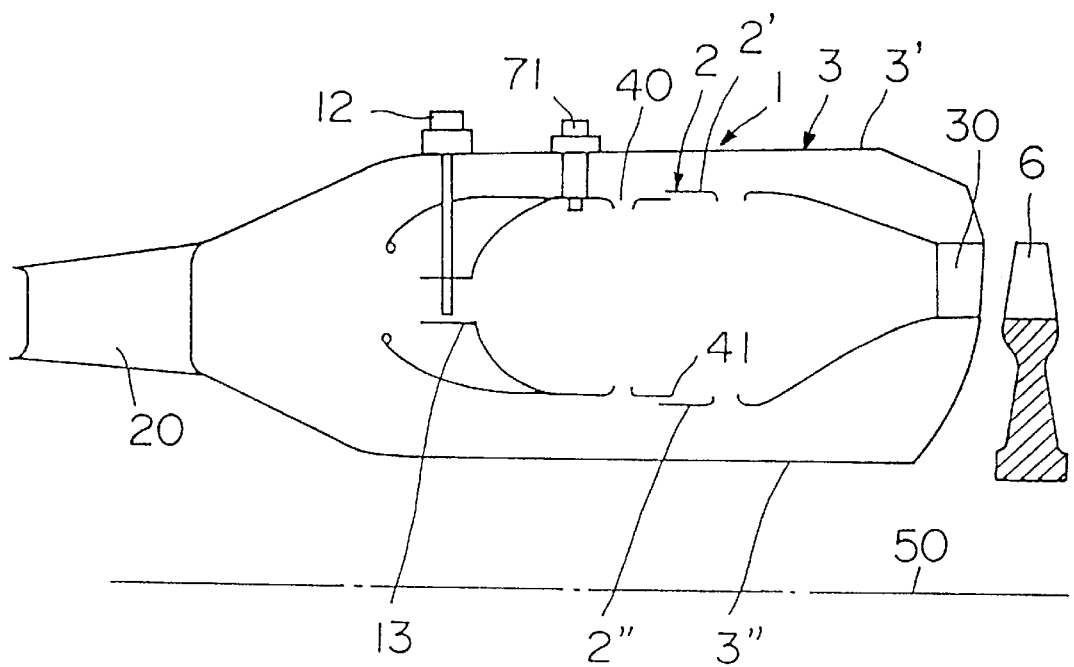
FIG. 11 is a structural drawing of a prior art gas turbine combustor.

The sixth embodiment of the present invention will be explained below with reference to FIG. 10. A combustor 1 shown in FIG. 10 is characterized in that, in addition to the structure of the first embodiment shown in FIG. 1, a combustion gas temperature detecting sensor 73 for detecting a temperature of combustion gas discharged from the combustion chamber in the direction of the center line 50 of the axis of rotation of each fuel-air pre-mixer 13 is provided. An air flow amount control valve 72 is provided within the liner 2 at the upstream side of the fuel-air pre-mixer 13. An air supply amount controller 90 controls a valve opening angle of the control valve 72 based on a detected value of the sensor 73. The other structure is the same as the embodiment shown in FIG. 1 and further explanation thereof is omitted here.

As shown in FIG. 10, a combustion gas temperature detected by each combustion gas temperature detecting sensor 73 is input to the air supply amount controller 90. The air supply amount controller 90 calculates an average value of each inputted detected value, finds a +/− difference between the average value and each detected value, and outputs a valve opening angle signal corresponding to the +/− difference to each corresponding air flow amount control valve 72.

The valve opening angle of the air amount control valve 72 is then controlled in correspondence with the signal. The amount of air supplied to the combustion chamber via each fuel-air pre-mixer 13 is increased or decreased accordingly.

It is noted that the relationship between the +/− difference between the average value and the detected value and the valve opening angle signal is found and stored in the air supply amount controller 90 in advance.

With the construction as described above, the distribution of the combustion gas temperature at the outlet of the liner 2, which might otherwise vary due to the circumferential distribution of air flow supplied from the compressor, may be equalized, and the melt-down of the turbine and pressure loss in the combustion chamber may be reduced.

It is noted that although the valve opening angle of the air flow amount control valve 72 has been controlled based on the difference between the average value and each detected value of the combustion gas temperature in the present embodiment, the present invention is not confined to this relationship. That is, it is also possible to set an adequate value of a temperature of combustion gas at the outlet of the liner 2 (combustion gas at the inlet of the turbine) in advance and to control the valve opening angle of the air flow amount control valve 72 so that the combustion gas holds that temperature.

The present embodiment has the advantage of a highly efficient turbine output being obtained. Needless to say, the present embodiment may be applied to the second and third embodiments.

As described above, the flow paths of liquid fuel are formed within the liner which forms the combustion chamber and the liner is equally cooled in the gas turbine combustor of the present invention. A hot spot which would otherwise be produced at the downstream side of the air hole created through the liner can thus be prevented; a material having a good heat transfer characteristic, even though its high temperature strength is small, may be used as the liner material.

Further, the air hole is eliminated from the liner and the flame holding area producing means is provided at the downstream side of the fuel-air pre-mixer, so that the gas fuel paths within the liner can be readily formed and the distribution of combustion gas temperature at the outlet of the combustion chamber, which would otherwise vary due to the air flowing in via the air hole, may be equalized in the gas turbine combustor, in addition to the advantage described above.

The size of the combustor may be reduced in the gas turbine combustor of the present invention with a construction in which the function of the casing is performed by the liner by eliminating the space between the liner and the casing. The length of the shaft connecting the compressor with the turbine can thus be shortened, and the size and weight of the combustor and the whole system may be reduced.

As is apparent from the above description, the present invention provides the gas turbine combustors in which the liner provided within the combustor casing can be cooled equally, and melt-down which would otherwise be caused by a hot spot produced therein can be prevented.

While preferred embodiments have been described, variations thereto will occur to those skilled in the art within the scope of the present inventive concepts which are delineated by the following claims.

What is claimed is:

1. A gas turbine combustor, comprising:
    a casing having an upstream side for connection to a compressor and a downstream side;
    a liner forming a combustion chamber therein, said liner having an upstream side and a downstream side, said downstream side of said casing being connected with said downstream side of said liner such that a space is formed between said casing and said liner;
    a fuel-air pre-mixer provided within said liner at said upstream side of said liner such that said fuel-air pre-mixer can mix liquid fuel with air from the compressor and supply the mixture to said combustion chamber;
    a plurality of fuel flow paths defined within said liner, said plurality of flow paths extending in a longitudinal direction of said liner;
    a liquid fuel supply provided at one end of said liner and connected to said plurality of fuel flow paths at a fuel supply side thereof;
    a liquid fuel outlet provided at the other end of said liner and connected with the other end of said plurality of fuel flow paths at a fuel discharge side thereof;
    an air hole extending through said liner and connecting said space between said liner and said casing with said combustion chamber, whereby air can be supplied from the compressor to said space and through said air hole to said combustion chamber so as to form a flame holding area;
    means for detecting the temperature of fuel flowing through each of said plurality of fuel flow paths at the fuel discharge side thereof; and
    means for controlling the amount of fuel supplied to each of said plurality of fuel flow paths at the fuel supply side in accordance with the temperature of the liquid fuel detected by said means for detecting.

2. A gas turbine combustor, comprising:
    a casing having an upstream side for connection to a compressor and a downstream side;

a liner forming a combustion chamber therein, said liner having an upstream side and a downstream side, said downstream side of said casing being connected with said downstream side of said liner such that a space is formed between said casing and said liner;

a fuel-air pre-mixer provided within said liner at said upstream side of said liner such that said fuel-air pre-mixer can mix liquid fuel with air from the compressor and supply the mixture to said combustion chamber;

a plurality of fuel flow paths defined within said liner, said plurality of flow paths extending in a longitudinal direction of said liner;

a liquid fuel supply provided at one end of said liner and connected to said plurality of fuel flow paths at a fuel supply side thereof;

a liquid fuel outlet provided at the other end of said liner and connected with the other end of said plurality of fuel flow paths at a fuel discharge side thereof;

means for forming a flame holding area in said combustion chamber, said means being located downstream of said fuel-air pre-mixer;

means for detecting the temperature of fuel flowing through each of said plurality of fuel flow paths at the fuel discharge side thereof; and means for controlling the amount of fuel supplied to each of said plurality of fuel flow paths at the fuel supply side in accordance with the temperature of the liquid fuel detected by said means for detecting.

3. A gas turbine combustor, comprising:

a casing having an upstream side for connection to a compressor and a downstream side;

a liner forming a combustion chamber therein, said liner having an upstream side and a downstream side, said downstream side of said casing being connected with said downstream side of said liner such that a space is formed between said casing and said liner;

a fuel-air pre-mixer provided within said liner at said upstream side of said liner such that said fuel-air pre-mixer can mix liquid fuel with air from the compressor and supply the mixture to said combustion chamber;

a plurality of fuel flow paths defined within said liner, said plurality of flow paths extending in a longitudinal direction of said liner;

a liquid fuel supply provided at one end of said liner and connected to said plurality of fuel flow paths at a fuel supply side thereof;

a liquid fuel outlet provided at the other end of said liner and connected with the other end of said plurality of fuel flow paths at a fuel discharge side thereof;

a flame holder located in said liner downstream of said fuel-air pre-mixer;

means for detecting the temperature of fuel flowing through each of said plurality of fuel flow paths at the fuel discharge side thereof; and means for controlling the amount of fuel supplied to each of said plurality of fuel flow paths at the fuel supply side in accordance with the temperature of the liquid fuel detected by said means for detecting.

4. The combustor of claim 3, wherein said flame holder comprises a bluff-body type flame holder.

5. The combustor of claim 3, wherein said flame holder is selected from the group consisting of a bluff-body, Vgutter, round-nose Vgutter and jet-curtain type flame holder.

6. The combustor of claim 3, wherein said liner has a double layer structure which comprises an outer cylinder and an inner cylinder, said plurality of fuel flow paths extending in said inner cylinder, said inner cylinder comprising a material having a high heat transfer characteristic and said outer cylinder comprising a material having a high strength.

* * * * *